United States Patent [19]

Huber et al.

[11] Patent Number: 5,719,473
[45] Date of Patent: Feb. 17, 1998

[54] HIGH FREQUENCY OPERATING CIRCUIT WITH IN-RUSH CURRENT PROTECTION FOR OPERATION OF DISCHARGE LAMPS

[75] Inventors: Andreas Huber, Maisach; Josef Osterried, Ottobrunn, both of Germany

[73] Assignee: Patent-Treuhand-Gelsellschaft F. Elektrische Gluehlampen mbH, Munich, Germany

[21] Appl. No.: 736,273

[22] Filed: Oct. 24, 1996

Related U.S. Application Data

[63] Continuation-in-part of Ser. No. 399,749, Mar. 7, 1995, abandoned.

[30] Foreign Application Priority Data

Mar. 11, 1994 [DE] Germany ............ 44 08 313.0

[51] Int. Cl.$^6$ ............................................. H05B 37/02
[52] U.S. Cl. ............... 315/247; 323/238; 323/222; 315/225
[58] Field of Search ................... 315/247, 194, 315/227 R, 225, 362, DIG. 7; 323/908, 222, 238, 239; 363/89, 16

[56] References Cited

U.S. PATENT DOCUMENTS

| 3,781,637 | 12/1973 | Potter | 323/908 X |
|---|---|---|---|
| 4,511,823 | 4/1985 | Eaton et al. | 315/226 |
| 4,677,366 | 6/1987 | Wilkinson et al. | 363/89 X |
| 5,396,153 | 3/1995 | Shackle | 315/247 |

FOREIGN PATENT DOCUMENTS

| 0 440 245 | 8/1991 | European Pat. Off. | |
| 0470750 | 2/1992 | European Pat. Off. | 315/362 |
| 33 08 320 | 9/1984 | Germany. | |

*Primary Examiner*—Robert Pascal
*Assistant Examiner*—Arnold Kinkead
*Attorney, Agent, or Firm*—Frishauf, Holtz, Goodman, Langer & Chick, P.C.

[57] ABSTRACT

An auxiliary or ballast circuit for high-frequency operation of discharge lamps (E), for example sodium high pressure discharge lamps, provides for controlled inrush or "ON current" by including a thyristor (TH1) or pair of thyristors (TH2, TH3) in the current supply path to the discharge lamp (E) integrated into a combination active filter-voltage step-up circuit. The gate of the thyristor (TH1) or a pair of thyristors (TH2, TH3) is, or are, controlled over a resistance (R2, R3, R4) connected to the output capacitor (C2) of the filter-voltage step-up circuit to fire the thyristor when input voltage goes through null, and the output capacitor (C2) has a predetermined voltage level above the input voltage. The output capacitor (C2), before firing, is charged by a charge control resistor (R1) connected in parallel across the anode-cathode path of the thyristor or thyristors. Thus, a maximum controlled inrush current is provided independent of ambient temperature or temperature of a NTC resistor and not requiring a relay.

13 Claims, 3 Drawing Sheets

HIGH FREQUENCY OPERATING CIRCUIT WITH IN-RUSH CURRENT PROTECTION FOR OPERATION OF DISCHARGE LAMPS

This application is a continuation of application Ser. No. 08/399,749, filed Mar. 7, 1995 now abandoned.

FIELD OF THE INVENTION

The present invention relates to a circuit to operate a discharge lamp with high-frequency supply, and more particularly to operate a high-pressure discharge lamp, from a network power supply, in which the network alternating current is rectified, and the rectified voltage is converted in an electronic voltage step-up circuit or boost converter to a higher voltage than network voltage, which then is rectified and further converted into a high-frequency alternating current for supply of a discharge lamp or discharge lamps.

BACKGROUND

Various types of electronic accessory circuits, sometimes referred to as ballast, to operate discharge lamps require storage elements in order to bridge the gaps in energy which arise when an alternating supply passes through null or zero. These zero-passages should not be transferred to the lamp, for example, in operation from a power network of 50 or 60 Hz, so that the light output from the lamp will be temporally uniform. Usually, an intermediate circuit or smoothing capacitor is used. Typically, the capacitor is an electrolytic capacitor since such capacitors have a high energy/volume characteristic.

Electronic accessory circuits frequently are so arranged that this intermediate or smoothing or energy storage capacitor is not directly connected to the output of a bridge rectifier. Rather, an active high-frequency filter in the form of a voltage step-up circuit or boost converter is frequently used, connected between the bridge rectifier and the smoothing capacitor. Such an active filter is required in almost all countries in order to insure that the network power used by the circuit and the lamp will be essentially sinusoidal. When such a lamp, with an accessory circuit of this type is first turned ON, high charge currents or inrush currents may flow, depending on the charge state of the smoothing capacitor and the respective instantaneous value of the network voltage.

High inrush currents, upon switching the circuit, deleteriously affect the switches controlling the lamp and the accessory circuit, and, additionally, require overdimensioning of components in the rectifier, typically diodes in the bridge rectifier, as well as all additional semiconductor paths, which are connected in the charging circuit of the smoothing capacitor. Such inrush currents may also affect network fuses inserted in the electronic accessory circuit, as well as main fuses and breakers in the power supply circuit to which the lamp is connected. If a plurality of electronic accessory circuits, connected to a particular phase, are simultaneously turned ON, high inrush currents may trigger a circuit breaker or blow a fuse.

The problem of high inrush currents has been solved in the past by connecting, for example, a negative temperature coefficient (NTC) resistor between the positive output of the rectifier circuit and the corresponding input of the electronic filter and voltage step-up circuit; alternatively, a charging resistor can be provided which, in operation of the lamp, is bridged or shunted by a relay.

NTC resistors introduce high losses in continuous operation. Additionally, current limiting depends on the temperature of the NTC resistor so that short-time interruption of current supply to the lamp may not provide sufficient time for the NTC resistor to cool, so that limitation of inrush current will not be effective. Relays do not have these problems, but are comparatively bulky and expensive.

THE INVENTION

It is an object to provide a lamp supply circuit which insures that the initial turn-on or inrush current will not exceed a pre-determined maximum value, independently of surrounding temperature or prior operating condition of the lamp, immediately preceding turn-ON of the lamp. The circuit, further, should be simple, use as few elements as possible, which are inexpensive, and should be of overall inexpensive construction.

Briefly, at least one thyristor is provided having, for example, its anode terminal connected to the positive output terminal of a bridge rectifier which rectifies network current. The anode-cathode part of the thyristor, which may be a single thyristor element, or a plurality of thyristor elements, are further connected to a junction of the input capacitor to the active filter, which also forms the output capacitor of the bridge rectifier, and one terminal of the inductance used in the active filter-step-up circuit combination. A coupling resistor is connected to the control terminal, that is, the gate of the thyristor, and the positive output terminal of the step-up circuit. A dropping resistor is connected in parallel to the anode-cathode terminals of the thyristor or group of thyristors.

More than one thyristor may be used connected, for example, through the bridge rectifier, that is, two such thyristors may be in parallel to diodes in the bridge rectifier.

Connecting a thyristor between the d-c output from the rectifier, or connecting thyristors, respectively, between the alternating current inputs of the rectifier and the junction of the input capacitor and the choke or inductance within the combination filter-voltage step-up circuit, has the effect that the thyristor, or the thyristors block until the voltage on the smoothing capacitor is higher than the voltage at the input capacitor, so that the smoothing capacitor can charge during this time only over the resistor connected in parallel to the thyristor or thyristors. The charge current is thus defined and limited by the resistance of the resistor. The charge current, thus, can be optimized. The thyristors are controlled only during and by the operation of the voltage step-up circuit. Any additional triggering units, for example in form of an opto coupler or an auxiliary winding on the inductance of the voltage step-up circuit is not necessary.

Use of two thyristors connected to the ac inputs of the bridge rectifier has the advantage of further reduction of loss energy, since the current path to the lamp when the thyristors are ON will include only two semiconductor paths. Use of only one thyristor places three semiconductor paths in the bridge rectifier and the voltage step-up circuit to the lamp. Use of two thyristors is therefore particularly desirable in accessory circuits designed for high power.

A capacitor between the cathode and the gate of the thyristors advantageously prevents overhead triggering of the thyristor. "Overhead triggering of the thyristor" is due to current derived from the parasitic capacitance of the thyristor in the gate thereof, resulting in spurious conduction of the thyristor.

DRAWINGS

DETAILED DESCRIPTION

Figure 1:
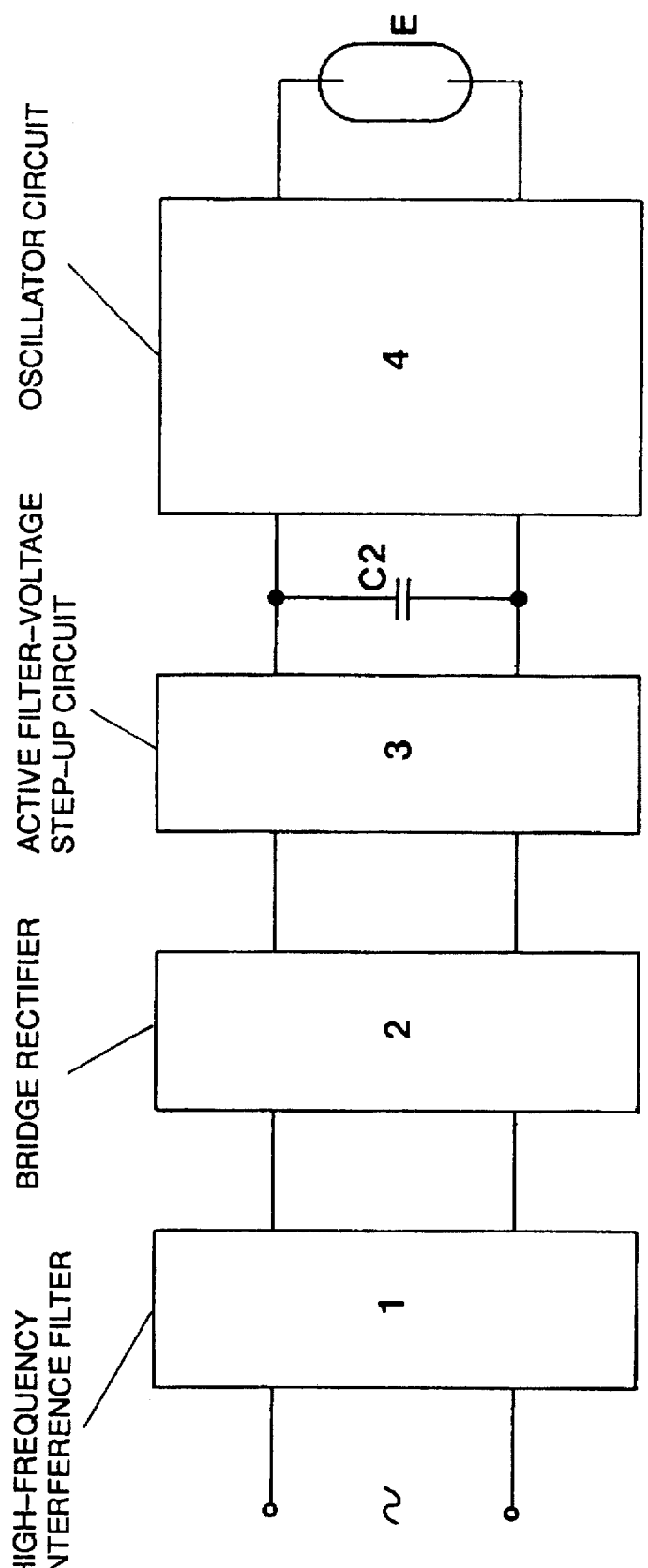
FIG. 1 is a highly schematic block circuit diagram for high-frequency operation of a discharge lamp with an active filter to insure sinusoidal form of supply current.

The general circuit diagram of the current supply for a discharge lamp E is well known. FIG. 1 illustrates such a circuit diagram in which an alternating current supply is connected to a high-frequency interference filter 1 which, in turn, is connected to bridge rectifier 2. The bridge rectifier 2 is connected to a combination active filter-voltage step-up circuit 3. The voltage step-up circuit 3 has an output Capacitor C2, also referred to as an intermediate circuit or smoothing capacitor. The combined filter-voltage enhancement circuit provides direct current to an oscillator circuit 4 which provides high-frequency energy to the discharge lamp E.

The present invention is particularly concerned with the circuits 2 and 3, that is, the bridge rectifier and the combined filter-voltage step-up circuit, when coupled to the smoothing capacitor C2. The circuit of the input filter 1, as well as the circuit of the push-pull oscillator are well known and do not form part of the present invention.

Figure 2:
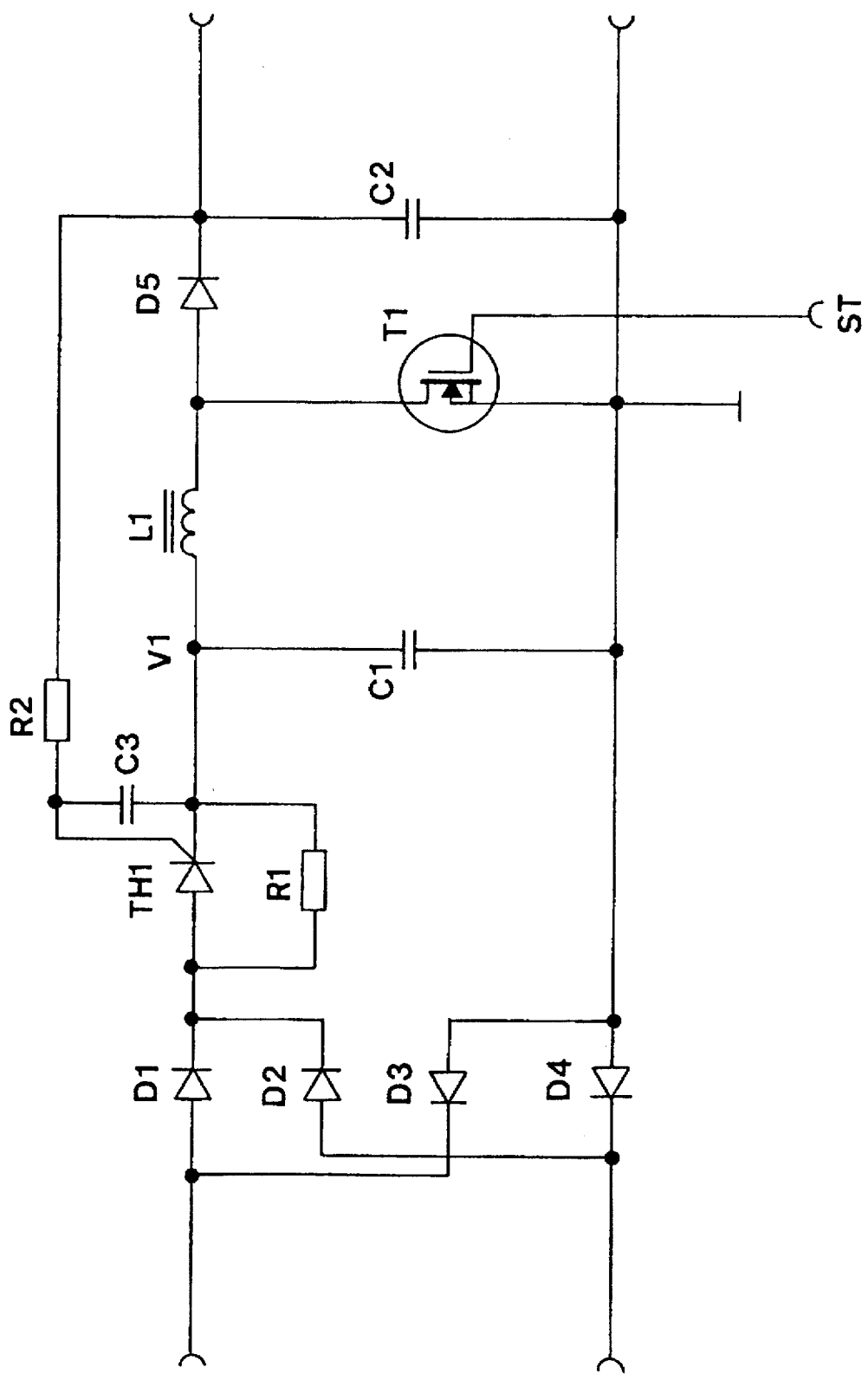
FIG. 2 is a detailed circuit diagram illustrating the portion of the circuit of FIG. 1 which includes the bridge rectifier and the voltage step-up circuit utilizing a single thyristor.

Referring to FIG. 2:

FIG. 2 illustrates a first embodiment, using a transistor T1, the bridge rectifier 2, the voltage step-up circuit 3, and the smoothing capacitor C2. The bridge rectifier is constructed in well-known form, of four diodes D1–D4. An input capacitor C1 is connected across the output of the bridge rectifier. A series circuit, including an inductance L1, and the drain source path of a MOS-FET (metal oxide field effect transistor) T1 is connected in parallel to the input capacitor C1. The inductance L1 is connected to the positive output of the bridge rectifier. The series circuit of a rectifying diode D5, connected in direct current pass direction, and the intermediate or smoothing capacitor C2 is connected in parallel to the MOS-FET transistor T1.

In accordance with the present invention, the anode-cathode path of a thyristor TH1 is connected between the positive output terminal of the bridge rectifier and a junction V1 between the input capacitor C1 and the inductance L1. The gate of the thyristor TH1 is connected through a resistor R2 with the positive terminal of the intermediate or smoothing capacitor C2. The anode-cathode path of the thyristor TH1 is, further, bridged by a charge control resistor R1. A capacitor C3 is connected between the cathode of thyristor TH1 and the gate thereof. The MOS-FET transistor T1 is controlled by control signals connected to a terminal ST.

Operation, embodiment of FIG. 2

Let it be assumed that the intermediate circuit capacitor C2 is completely discharged. When the network power supply is connected ON, current will flow over the diodes D1, D4 and D2, D3, respectively, depending on the polarity of the network voltage when the switch is turned ON. This current will flow from the bridge rectifier through the resistor R1 into the input capacitor C1, and in parallel thereto through inductance L1 and diode D5 into the smoothing capacitor C2. Let it be further assumed that the transistor T1 is not active; the voltage on capacitor C1 will then be equal to the voltage at the capacitor C2, and thus the thyristor TH1 cannot fire, since no gate current will be present. The charge current flowing to the intermediate circuit or smoothing capacitor C2 thus is defined only by the current flowing through resistor R1. When the voltage step-up circuit is turned ON by a control signal at terminal ST, the voltage at capacitor C1 will follow roughly the voltage of the network, and the voltage at the smoothing capacitor C2 will increase. At this point, there will be voltage differences between the cathode of the thyristor TH1 and the voltage at the capacitor C2, permitting gate current to flow through resistor R2 into the thyristor TH1.

The voltage difference is highest when the current at the network terminal passes through 0. Thus, at just that instant of time when it is most desirable to fire the thyristor TH1, sufficient gate current will be available to effect such firing. During normal operation, current will flow not only through the resistor R1 but, primarily, through the substantially low resistance connection formed by the anode-cathode path of the thyristor TH1. The losses on the thyristor then will be only those which are due to the voltage drop of the anode-cathode path on the thyristor, multiplied with the average rectified current of the network supply.

Figure 3:
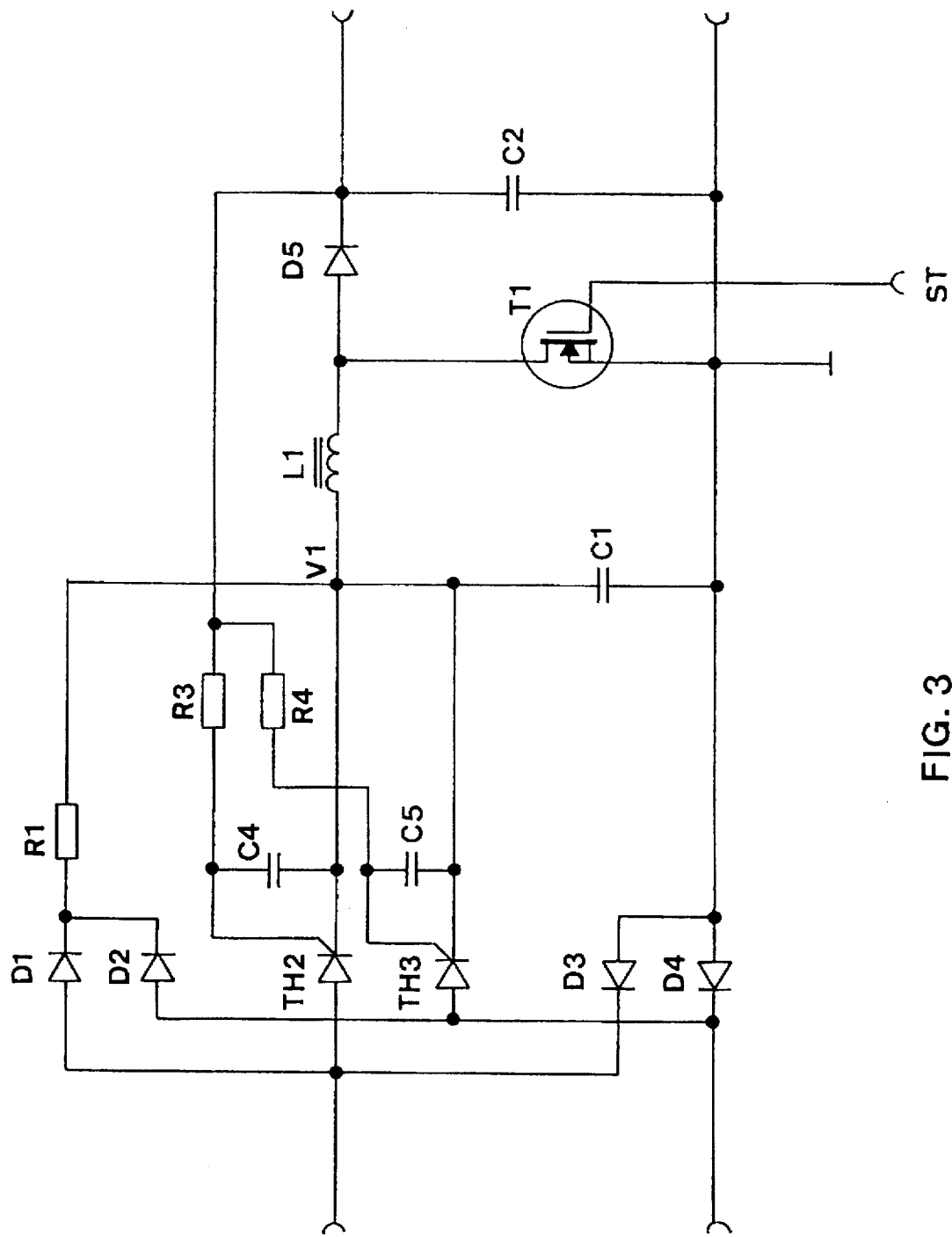
FIG. 3 illustrates another embodiment of the invention, illustrating the portion of the circuit of the bridge rectifier and the voltage step-up circuit and using two thyristors.

Maximum reduction of losses can be obtained by the circuit in accordance with FIG. 3, which utilizes two thyristors TH2, TH3.

FIG. 3, shows another embodiment of the present invention, having, as before, the circuit combination of rectifier 2 and active filter-voltage step-up circuit 3, with capacitor C2. The bridge rectifier, the step-up circuit or boost converter 3 and the smoothing capacitor 2 are identical to that shown in FIG. 2, and the same reference numerals have been used.

Inrush current is limited in this circuit by two thyristors TH2, TH3, which are connected with their anodes, respectively, to the AC input, and with their cathodes to a junction V1 between the input capacitor C1 and the inductance L1. The gate inputs of the two thyristors TH2, TH3, are connected over respective resistors R3, R4 with the positive terminal of the intermediate circuit or charge storage and smoothing capacitor C2. The cathodes of the thyristors are coupled via capacitors C4, C5 to the gate terminals. The charge control resistor R1, in parallel to the anode-cathode paths of the thyristors TH2, TH3 is serially connected to the diode D1 and D2 of the bridge rectifier and, in turn, to the junction V1.

Operation, circuit of FIG. 3

The basic operation is the same as that discussed in connection with FIG. 2. This circuit variation has the advantage that in normal operation of the circuit, the input current flows only through two semiconductor main paths, namely, the anode-cathode paths of the thyristor TH2 and the diode D4, or the thyristor TH3 and the diode D3, depending on the direction of the AC flow. In the embodiment of FIG. 2, the input current has to flow through two respective diodes D1, D4 or D2, D3, respectively, and additionally through the thyristor TH1. Thus, the circuit of FIG. 3 has somewhat lower losses which, therefore, make it desirable and economical for use with lamps of high power, requiring higher powered accessory circuits.

In an illustrative example, the components listed in the table below were used in an accessory circuit according to FIG. 2 for a sodium high-pressure discharge lamp having a nominal rating of 80 W:

D1 to D4: 1 N 4007
TH1: C 106 M

R1: 33 Ω
R2: 1 M Ω
C1: 150 nF
C2: 75 µF
C3: 22 nF
L1: 1.44 mH
D5: BYW 36
T1: IRF 830

The above table shows that the capacitance of capacitor C2 has a substantially higher value than that of capacitor C1.

Capacitors C3, C4 and C5 form gate impedances which could be replaced by resistors or a resistor-capacitor network.

A suitable control circuit for transistor T1, providing control signals to terminal ST is described in U.S. Pat. No. 4,792,887, Bernitz et al. the disclosure of which is hereby incorporated by reference.

A typical circuit for block 4 (FIG. 1) is disclosed in U.S. patent application Ser. No. 08/339,750, filed Mar. 7, 1995, Bernitz et al, the disclosure of which is hereby the disclosure of which is hereby incorporated by reference.

Various changes and modifications may be made, and any features disclosed herein in connection with any one of the embodiments may be used with the other.

We claim:

1. High-frequency operating circuit for at least one discharge lamp, optionally a high-pressure discharge lamp, having a bridge rectifier (2, D1–D4) rectifying alternating current received from a supply network and supplying a rectified voltage;

an active filter-voltage step-up circuit (3) connected to the bridge rectifier, said active filter-voltage step-up circuit having an input capacitor (C1) connected across output terminals of the bridge rectifier, a smoothing capacitor (C2) connected across output terminals of the active filter-voltage step-up circuit, an inductance (L1), serially connected between one output terminal of the bridge rectifier and an output terminal of the voltage step-up circuit, a switching element (T1), and a rectifying diode (D5) connected, with respect to energy flow, in advance of the smoothing capacitor (C2), and comprising at least one thyristor (TH1, TH2, TH3) having the anode terminal coupled to one terminal of the supply network, optionally to the positive output terminal of said bridge rectifier (2, D1–D4), said at least one thyristor (TH1, TH2, TH3) having the cathode terminal connected to a junction (V1) of the input capacitor (C1) with one terminal of the inductance (L1) of the active filter voltage-step-up circuit (3) and, hence, upon becoming conductive, directly connecting power to said active filter voltage-step-up circuit (3);

a charge control resistor (R1) connected in parallel to the anode-cathode terminals of the at least one thyristor (TH1, TH2, TH3), and providing controlled charging current to the input capacitor (C1) and to the smoothing capacitator (C2); and a coupling resistor (R2, R3, R4) connected to the control terminal (gate) of the at the least one thyristor, and the smoothing capacitor (C2) to control firing of the at least one thyristor (TH1, TH2, TH3) when the voltage across the smoothing capacitor (C2) exceeds said rectified voltage across the output terminals of the rectifier and hence across the input capacitor (C1).

2. The circuit of claim 1, further including an impedance optionally a capacitor (C3, C4, C5), connecting the cathode of each of the at least one thyristor (TH1, TH2, TH3) to the gate terminal of the respective thyristor.

3. The circuit of claim 1, wherein said switching element (T1) comprises a transistor.

4. The circuit of claim 1, wherein the smoothing capacitor (C2) has a capacitance value which is large with respect to that of said input capacitor (C1).

5. High-frequency operating circuit for at least one discharge lamp (E), optionally a high-pressure discharge lamp, having a bridge rectifier (2, D1–D4) rectifying alternating current received from a supply network and supplying a rectified voltage;

an active filter-voltage step-up circuit (3) connected to the bridge rectifier, said active filter-voltage step-up circuit having an input capacitor (C1) connected across output terminals of the bridge rectifier, a smoothing capacitor (C2) connected across output terminals of the active filter-voltage step-up circuit, an inductance (L1), serially connected between one output terminal of the bridge rectifier and an output terminal of the voltage step-up circuit, a switching element (T1), and a rectifying diode (D5) connected, with respect to energy flow, in advance of the smoothing capacitor (C2), and comprising a thyristor (TH1) having the anode terminal connected to the positive output terminal of the bridge rectifier (2, D1–D4), said thyristor (TH1) having the cathode terminal connected to a junction (V1) of the input capacitor (C1) with one terminal of the inductance (L1) of the active filter voltage-step-up circuit (3) and, hence, upon becoming conductive, directly connecting power to said active filter voltage-step-up circuit (3);

a charge control resistor (R1) connected in parallel to the anode-cathode terminal of the thyristor (TH1), and providing controlled charging current to the input capacitor (C1) and the smoothing capacitator (C2); and a coupling resistor (R2) connected to the control terminal (gate) of the thyristor (TH1), and the positive pole of the smoothing capacitor (C2) to control firing of the thyristor (TH1) only when the voltage across the smooting capacitor (C2) exceeds said rectified supplied by the bridge rectifier (2, D1–D4) across said input capacitor (C1).

6. The circuit of claim 5, further including an impedance (C3), optionally a capacitor, connecting the cathode of the thyristor (TH1) to the gate terminal of the thyristor.

7. The circuit of claim 5, wherein said switching element (T1) comprises a transistor.

8. The circuit of claim 5, wherein said output capacitor (C2) has a capacitance value which is large with respect to that of said input capacitor (C1).

9. High-frequency operating circuit for at least one discharge lamp (E), optionally a high-pressure discharge lamp, having a bridge rectifier (2, D1–D4) rectifying alternating current received from a supply network and supplying a rectified voltage;

an active filter-voltage step-up circuit (3) connected to the bridge rectifier, said active filter-voltage step-up circuit having an input capacitor (C1) connected across output terminals of the bridge rectifier, a smoothing capacitor (C2) connected across output terminals of the active filter-voltage step-up circuit, an inductance (L1), serially connected between one output terminal of the bridge rectifier and an output terminal of the voltage step-up circuit, a switching element (T1), and a rectifying diode (D5) connected, with respect to energy flow, in advance of the smoothing capacitor (C2), and comprising a pair of thyristors (TH2, TH3) each having the anode terminal connected to one of the terminals of the supply network and further having the cathode terminal connected to to a junction (V1) of the input capacitor (C1), with one terminal of the inductance (L1) of the active filter-voltage step-up circuit (3);

a charge control resistor (R1) connected between the positive output terminal of the bridge rectifier and said junction (V1) of the input capacitor (C1) and the inductance (L1), to provide controlled charging current to the input capacitor (C1) and the smoothing capacitor (C2); and a pair of coupling impedances (R3, R4) connected to the control terminal (gate) of each of said thyristors (TH2, TH3) and the positive pole of the smoothing capacitor (C2) to control firing of each of said thyristors only when the voltage across the smoothing capacitor (C2) exceeds said rectified voltage across said input capacitor (C1).

10. The circuit of claim 9, further including gate impedances (C4, C5), optionally capacitors, connected to the cathodes of the thyristors (TH2, TH3) and respective control terminals (gate) of each of the thyristors (TH2, TH3).

11. The circuit of claim 9, wherein said switching element (T1) comprises a transistor.

12. The circuit of claim 9, wherein said smoothing capacitor (C2) has a capacitance value which is large with respect to that of said input capacitor (C1).

13. High-frequency operating circuit for at least one discharge lamp, optionally a high-pressure discharge lamp, having a bridge rectifier (2, D1–D4) rectifying alternating current received from a supply network and supplying a rectified voltage;

an active filter-voltage step-up circuit (3) connected to the bridge rectifier, said active filter-voltage step-up circuit having an input capacitor (C1) connected across output terminals of the bridge rectifier, a smoothing capacitor (C2) having a capacitance value high with respect to that of the input capacitor (C1), connected across output terminals of the active filter-voltage step-up circuit, an inductance (L1), serially connected between one output terminal of the bridge rectifier and an output terminal of the voltage step-up circuit, a switching element (T1), and a rectifying diode (D5) connected, with respect to energy flow, in advance of the smoothing capacitor (C2), and comprising, in accordance with the invention, at least one thyristor (TH1, TH2, TH3) in circuit between said rectifier and said input capacitor (C1);

coupling means (R2, R3, R4) connecting the gate of the at least one thyristor to said smoothing capacitor to apply firing voltage to the respective gate of the at least one thyristor which arises when the voltage on the smoothing capacitor (C2), and hence the respective gate exceed the voltage across said input capacitor (C1), derived from said rectifier and applied to the thyristor; and a charge control resistor (R1) connected in parallel to the anode-cathode terminals of the at least one thyristor (TH1, TH2, TH3) and providing controlled charging current to the input capacitor (C1) and the smoothing capacitor (C2) to gradually charge said capacitors (C1, C2).

* * * * *